(12) United States Patent
Osterland et al.

(10) Patent No.: US 7,120,971 B2
(45) Date of Patent: Oct. 17, 2006

(54) LOW INSERTION EFFORT U-BASE RETAINER

(75) Inventors: Robert W Osterland, East China Township, MI (US); Jeff A Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/469,718

(22) PCT Filed: Mar. 4, 2002

(86) PCT No.: PCT/US02/06753

§ 371 (c)(1),
(2), (4) Date: Sep. 2, 2003

(87) PCT Pub. No.: WO02/070905

PCT Pub. Date: Sep. 12, 2002

(65) Prior Publication Data

US 2004/0111841 A1    Jun. 17, 2004

Related U.S. Application Data

(60) Provisional application No. 60/272,992, filed on Mar. 2, 2001.

(51) Int. Cl.
  *A44B 17/00*   (2006.01)

(52) U.S. Cl. .................. 24/295; 24/458; 411/508
(58) Field of Classification Search .......... 24/293–296, 24/289, 295, 458, 546, 547, 556, 561, 563, 24/292, 297; 52/716.8; 292/17; 411/509, 411/508, 553, 173, 179, 182, 913; 248/231.9
See application file for complete search history.

(56) References Cited

U.S. PATENT DOCUMENTS 1,959,096 A * 5/1934 Fernberg ............... 24/295
2,086,288 A * 7/1937 Van Uum ............... 24/295

(Continued)

FOREIGN PATENT DOCUMENTS

CA           496700           10/1953

(Continued)

*Primary Examiner*—Jack W. Lavinder
(74) *Attorney, Agent, or Firm*—Harness, Dickey & Pierce, P.L.C.

(57) ABSTRACT

A resilient clip for engaging a structure and having a body portion (22) with a pair of top flanges (24), a pair of fastening fingers (26) and a pair of abutting coupling flanges (28). Each of the fastening fingers (26) are coupled to the body portion (22) that is coupled to an associated top flange (24). Each of the abutting flanges (26) has a concave surface, which engages the mounting structure. The fastening finger (26) portions are configured to engage a first side of a mounting flange on an interior trim component.

25 Claims, 12 Drawing Sheets

U.S. PATENT DOCUMENTS

| | | | |
|---|---|---|---|
| 2,096,648 A | 10/1937 | Place | |
| 2,198,186 A | 4/1940 | Tinnerman | |
| 2,295,444 A | 9/1942 | Woodward | |
| 2,322,656 A * | 6/1943 | Murphy | 24/293 |
| 2,574,330 A | 11/1951 | Judd | |
| 2,590,264 A | 3/1952 | Meyers et al. | |
| 2,825,948 A | 3/1958 | Parkin | |
| 2,848,768 A | 8/1958 | Taylor | |
| 2,849,765 A | 9/1958 | DeSena | |
| 2,946,612 A | 7/1960 | Ahlgren | |
| 3,038,747 A | 6/1962 | Rapata | |
| 3,208,122 A | 9/1965 | Holton | |
| 3,310,929 A | 3/1967 | Garvey | |
| 3,703,120 A | 11/1972 | VanBuren, Jr. | |
| 3,830,134 A | 8/1974 | Erickson | |
| 3,842,565 A | 10/1974 | Brown et al. | |
| 3,869,958 A | 3/1975 | Murayama | |
| 3,977,048 A | 8/1976 | Benedetti | |
| 4,043,579 A | 8/1977 | Meyer | |
| 4,245,652 A | 1/1981 | Kelly et al. | |
| 4,271,634 A | 6/1981 | Andrzejewski | |
| 4,300,865 A | 11/1981 | Murray | |
| 4,312,614 A | 1/1982 | Palmer et al. | |
| 4,324,826 A | 4/1982 | Ginster | |
| 4,356,601 A | 11/1982 | Kimura | |
| 4,399,644 A | 8/1983 | Bright | |
| 4,402,118 A | 9/1983 | Benedetti | |
| 4,405,272 A | 9/1983 | Wollar | |
| 4,470,178 A | 9/1984 | Matsui | |
| 4,497,516 A | 2/1985 | Morita et al. | |
| 4,595,325 A | 6/1986 | Moran et al. | |
| 4,630,338 A | 12/1986 | Osterland et al. | |
| 4,644,612 A | 2/1987 | Osterland | |
| 4,687,434 A | 8/1987 | Beglinger | |
| 4,747,199 A | 5/1988 | Kitchen | |
| 4,765,036 A | 8/1988 | Iguchi et al. | |
| 4,778,320 A | 10/1988 | Nakama | |
| 4,780,037 A | 10/1988 | Payne | |
| 4,787,795 A | 11/1988 | Kraus | |
| 4,792,475 A | 12/1988 | Bien | |
| 4,861,208 A | 8/1989 | Boundy | |
| 4,865,505 A | 9/1989 | Okada | |
| 4,920,618 A | 5/1990 | Iguchi | |
| 4,925,351 A | 5/1990 | Fisher | |
| 4,927,306 A | 5/1990 | Sato | |
| 5,028,190 A | 7/1991 | Loughlin, Jr. et al. | |
| 5,035,661 A | 7/1991 | Steinhardt et al. | |
| 5,106,223 A | 4/1992 | Kraus | |
| 5,129,768 A | 7/1992 | Hoyle et al. | |
| 5,173,026 A | 12/1992 | Cordola et al. | |
| 5,193,961 A | 3/1993 | Hoyle et al. | |
| 5,251,467 A | 10/1993 | Anderson | |
| 5,261,650 A | 11/1993 | Hein | |
| 5,296,068 A | 3/1994 | Turner | |
| 5,297,322 A | 3/1994 | Kraus | |
| 5,360,304 A | 11/1994 | Notaro et al. | |
| 5,367,751 A | 11/1994 | DeWitt | |
| 5,399,045 A | 3/1995 | Yoneda et al. | |
| 5,419,606 A | 5/1995 | Hull et al. | |
| 5,448,809 A | 9/1995 | Kraus | |
| 5,484,221 A | 1/1996 | DeCoux | |
| 5,494,391 A | 2/1996 | Zhou | |
| 5,533,237 A | 7/1996 | Higgins | |
| 5,542,158 A | 8/1996 | Gronau et al. | |
| 5,561,961 A | 10/1996 | Paul | |
| 5,567,082 A | 10/1996 | Ball et al. | |
| 5,651,562 A | 7/1997 | Hagen et al. | |
| 5,671,513 A | 9/1997 | Kawahara et al. | |
| 5,704,753 A | 1/1998 | Ueno | |
| 5,725,343 A | 3/1998 | Smith | |
| 5,738,476 A | 4/1998 | Assimakopoulos | |
| 5,758,987 A | 6/1998 | Frame et al. | |
| 5,774,949 A | 7/1998 | Cornell et al. | |
| 5,775,860 A | 7/1998 | Meyer | |
| 5,775,861 A | 7/1998 | Leon et al. | |
| 5,797,714 A | 8/1998 | Oddenino | |
| 5,803,532 A | 9/1998 | Karuppaswamy et al. | |
| 5,829,910 A | 11/1998 | Kameyama | |
| 5,829,934 A | 11/1998 | Danby et al. | |
| 5,871,320 A | 2/1999 | Kovac | |
| 5,887,319 A | 3/1999 | Smith | |
| 5,966,782 A | 10/1999 | Ishihara et al. | |
| 5,987,714 A | 11/1999 | Smith | |
| 6,074,150 A | 6/2000 | Shinozaki et al. | |
| 6,095,734 A | 8/2000 | Postadan et al. | |
| 6,101,686 A * | 8/2000 | Velthoven et al. | 24/295 |
| 6,119,316 A | 9/2000 | Ishihara et al. | |
| 6,141,837 A | 11/2000 | Wisniewski | |
| 6,145,870 A | 11/2000 | Devane et al. | |
| 6,154,933 A | 12/2000 | Vetter et al. | |
| 6,209,178 B1 | 4/2001 | Wiese et al. | |
| 6,244,805 B1 | 6/2001 | Everard | |
| 6,279,207 B1 | 8/2001 | Vassiliou | |
| 6,315,510 B1 | 11/2001 | Sturies et al. | |
| 6,317,937 B1 | 11/2001 | Ishihara et al. | |
| 6,320,134 B1 | 11/2001 | Rehberg et al. | |
| 6,353,981 B1 | 3/2002 | Smith | |
| 6,381,811 B1 | 5/2002 | Smith et al. | |
| 6,406,242 B1 | 6/2002 | Gordon | |
| 6,449,814 B1 | 9/2002 | Dinsmore et al. | |
| 6,453,522 B1 | 9/2002 | Magarino et al. | |
| 6,474,921 B1 | 11/2002 | Gordon | |
| 6,481,682 B1 * | 11/2002 | Miura | 248/231.9 |
| 6,497,011 B1 | 12/2002 | Smith et al. | |
| 6,517,302 B1 | 2/2003 | Lee | |
| 6,527,471 B1 | 3/2003 | Smith et al. | |
| 6,568,045 B1 | 5/2003 | Smith | |
| 6,629,809 B1 | 10/2003 | Vassiliou | |
| 6,648,542 B1 | 11/2003 | Smith et al. | |
| 6,665,914 B1 | 12/2003 | Ogawa | |
| 6,691,380 B1 | 2/2004 | Vassiliou | |
| 6,718,599 B1 | 4/2004 | Dickinson et al. | |
| 6,726,418 B1 | 4/2004 | Dickinson et al. | |
| 6,745,440 B1 | 6/2004 | Vassiliou | |
| 6,769,849 B1 | 8/2004 | Yoneoka | |
| 6,840,727 B1 | 1/2005 | Vassiliou | |
| 6,846,125 B1 | 1/2005 | Smith et al. | |
| 6,868,588 B1 | 3/2005 | Dickinson et al. | |
| 6,896,464 B1 | 5/2005 | Vassiliou | |
| 6,899,499 B1 | 5/2005 | Dickinson et al. | |
| 6,908,274 B1 | 6/2005 | Vassiliou | |
| 6,921,237 B1 | 7/2005 | Vassiliou | |
| 2002/0001502 A1 | 1/2002 | Smith et al. | |
| 2002/0017009 A1 | 2/2002 | Smith et al. | |
| 2002/0064435 A1 | 5/2002 | Sbongk | |
| 2002/0104201 A1 | 8/2002 | Smith et al. | |
| 2002/0194710 A1 | 12/2002 | Dickinson et al. | |
| 2003/0024077 A1 | 2/2003 | Vassiliou | |
| 2003/0024078 A1 | 2/2003 | Vassiliou | |
| 2004/0083582 A1 | 5/2004 | Dickinson et al. | |
| 2004/0096272 A1 | 5/2004 | Dickinson et al. | |
| 2004/115027 A1 | 6/2004 | Dickinson et al. | |
| 2005/0105987 A1 | 5/2005 | Giugliano et al. | |
| 2005/0246871 A1 * | 11/2005 | Lubera et al. | 24/295 |

FOREIGN PATENT DOCUMENTS

| | | |
|---|---|---|
| DE | 1 890 436 | 10/1968 |
| DE | 3621772 A1 | 1/1988 |
| DE | 38 22 463 | 9/1989 |
| DE | 44 16 698 | 11/1995 |
| DE | 196 26 050 | 2/1997 |
| DE | 196 40 165 | 4/1997 |
| DE | 29718903 U1 | 1/1998 |

| | | | | | |
|---|---|---|---|---|---|
| DE | 197 02 429 | 7/1998 | GB | 1570108 | 6/1980 |
| DE | 19747953 C1 | 10/1998 | GB | 2 078 851 | 1/1982 |
| DE | 200 04 580 | 8/2000 | GB | 2 305 462 | 4/1997 |
| DE | 100 59 522 | 6/2002 | GB | 2 316 707 | 3/1998 |
| EP | 0 855 523 | 7/1998 | JP | 5-32811 | 4/1993 |
| EP | 0 908 633 A1 | 4/1999 | JP | 5-69407 | 9/1993 |
| EP | 0 899466 B1 | 3/2002 | JP | 5-69408 | 9/1993 |
| FR | 2 520 457 | 7/1983 | JP | 6-247219 | 9/1994 |
| GB | 684098 | 12/1952 | JP | 07-293521 | 11/1995 |
| GB | 858018 | 1/1961 | JP | 08-121441 | 5/1996 |
| GB | 884123 | 12/1961 | WO | WO 00/40866 | 7/2000 |
| GB | 1055945 | 1/1967 | WO | WO 02/44570 | 6/2002 |
| GB | 1225623 | 3/1971 | | | |
| GB | 1406478 | 9/1975 | | | |

\* cited by examiner

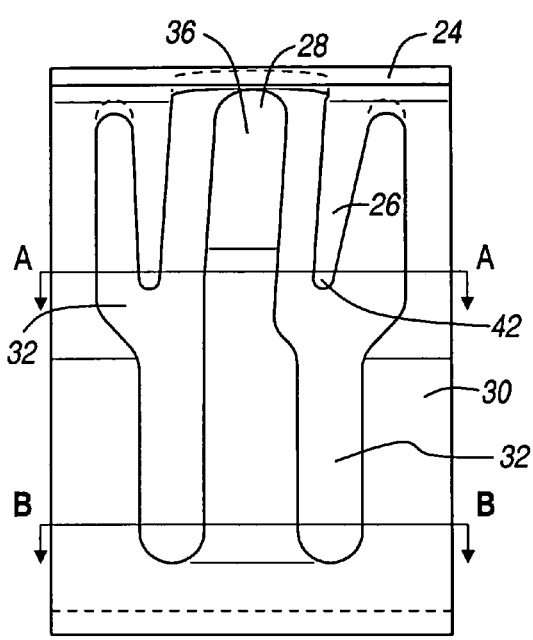
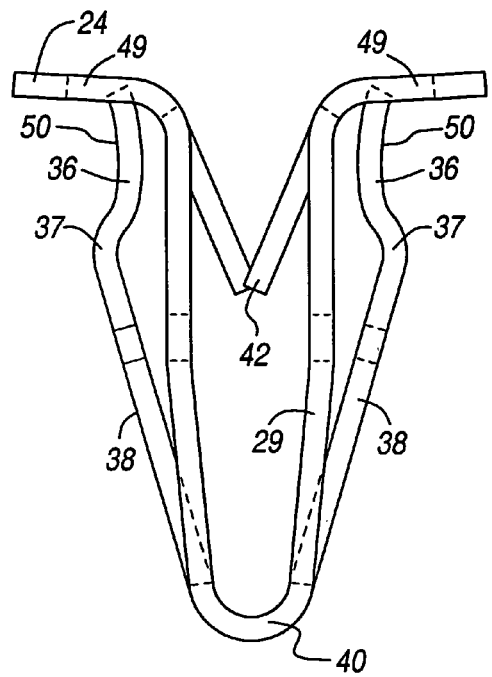
FIGURE 3A
FIGURE 4
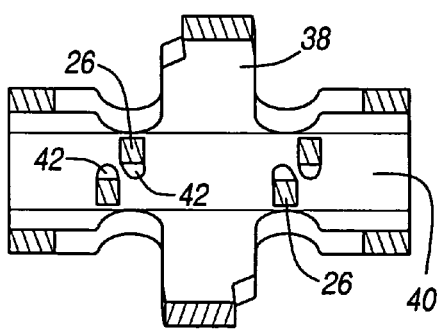
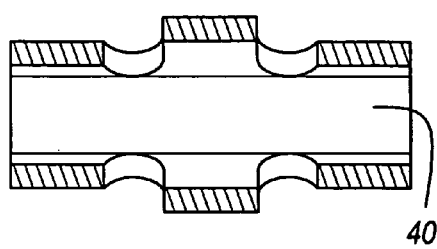
FIGURE 3B
SECTION A A
FIGURE 3C
SECTION B B

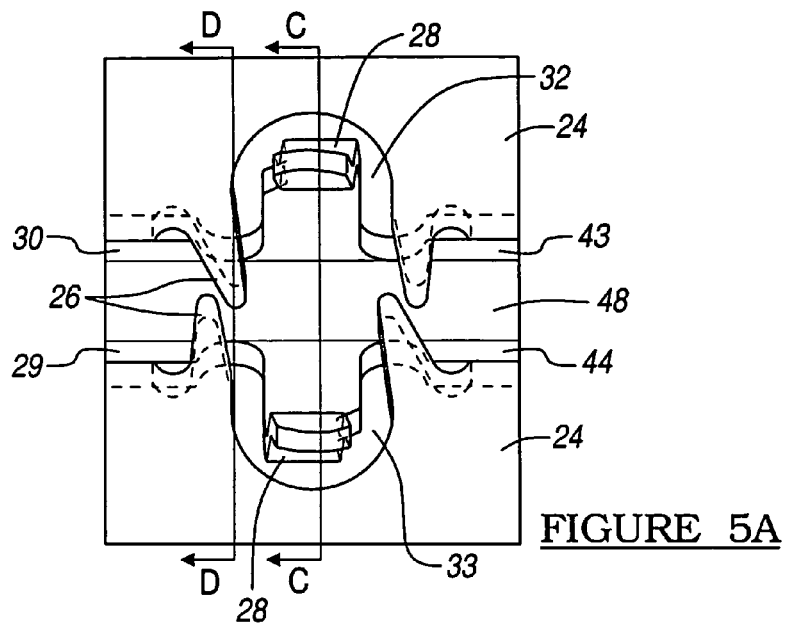
FIGURE 5A
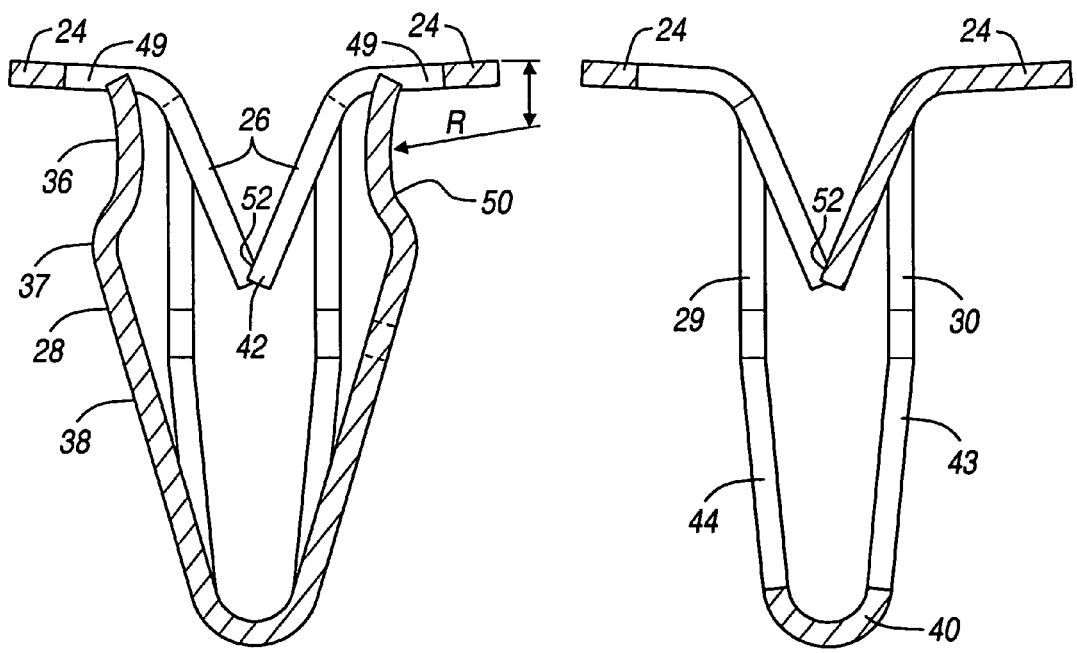
FIGURE 5B
SECTION C C
FIGURE 5C
SECTION D D

SECTION A A

SECTION B B

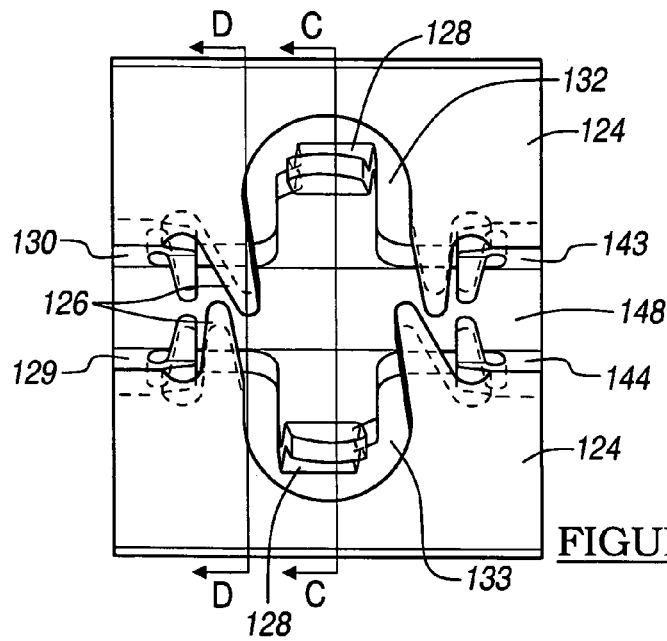
FIGURE 15A
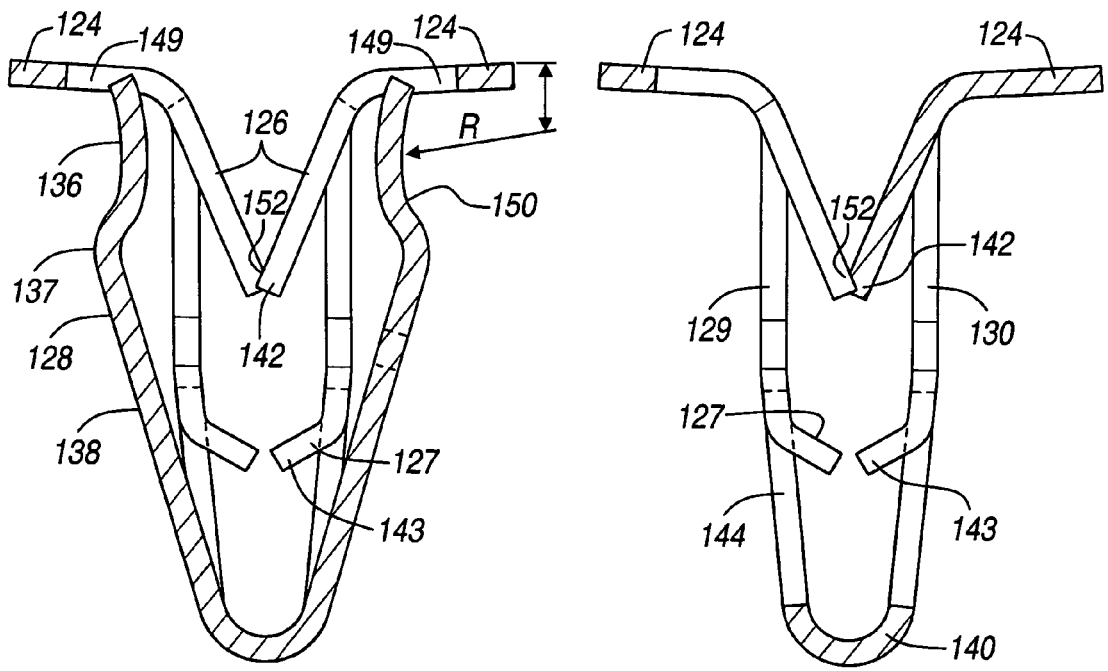
FIGURE 15B
SECTION C C
FIGURE 15C
SECTION D D

LOW INSERTION EFFORT U-BASE RETAINER

CROSS-REFERENCE TO RELATED APPLICATIONS

This application is a National Stage of International Application No. PCT/US02/06753, filed 04 Mar. 2002 which claims the benefit of U.S. Provisional Application No. 60/272,992, filed on 02 Mar. 2001. The disclosure(s) of the above application(s) is (are) incorporated herein by reference.

TECHNICAL FIELD

The present invention relates generally to resilient clip fasteners and more particularly to a resilient clip fastener that employs a particular surface geometry to secure the body portion of the resilient clip to a structure. More specifically, the present invention relates to a resilient clip fastener having a construction that utilizes abutment flanges to permit the clip to be inserted into an aperture with a relatively low insertion force while resisting relatively high withdrawal forces. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal.

Accordingly, there remains a need in the art for an improved fastener having a relatively low installation force and a relatively high removal force that is relatively more tolerant of misalignments problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In one preferred form, the present invention provides a resilient clip for engaging a structure. The resilient clip includes a body portion having a pair of top flanges, a pair of fastening members and a pair of abutting flanges. Each of the fastening members has a base portion that is coupled to an associated top flange. Each of the abutting flanges has a concave surface that engages the mounting structure.

BRIEF DESCRIPTION OF THE DRAWINGS

Additional advantages and features of the present invention will become apparent from the subsequent description and the appended claims, taken in conjunction with the accompanying drawings, wherein:

FIG. 3a is a side view of a portion of the fastener of FIG. 1 illustrating the spacing of the structures in greater detail;

FIGS. 3b and 3c depict cross-sectional views of the fastener depicted in FIG. 3a;

FIG. 4 is a side view of a fastener constructed in accordance with the teachings of the preferred embodiment of the present invention;

FIG. 5a is a top view of a portion of the fastener of FIG. 1, illustrating the clip structure in greater detail;

FIGS. 5b and 5c depict cross-sectional views of the fastener depicted in FIG. 5a;

FIGS. 14b and 14c depict cross-sectional views of the fastener depicted in FIG. 14a.

FIG. 17a is a top view of a portion of the fastener of FIG. 12, illustrating the clip structure in greater detail;

FIGS. 15b and 15c depict cross-sectional views of the fastener depicted in FIG. 15a.

FIG. 16 is a lower perspective view of the fastener of FIG. 12;

DETAILED DESCRIPTION OF THE PREFERRED EMBODIMENT

Figure 1:
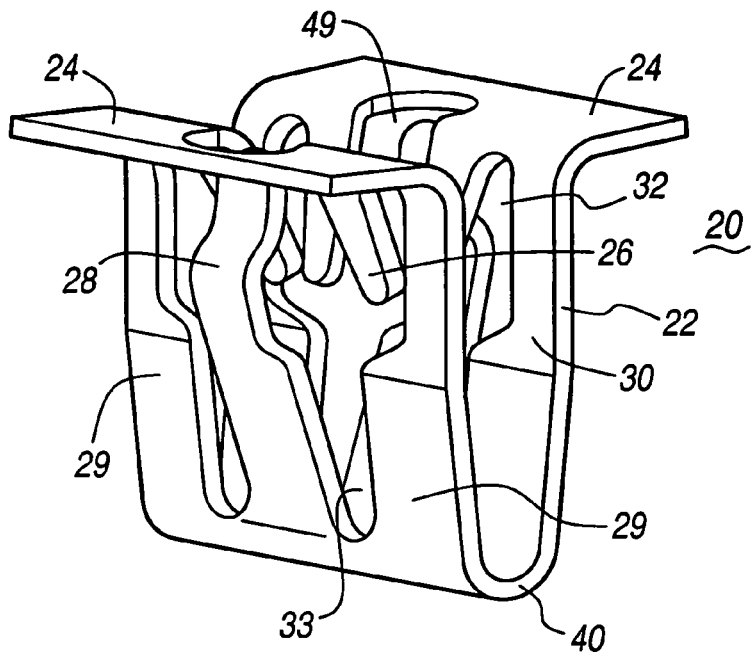
FIG. 1 is a perspective view of a fastener constructed in accordance with the teachings of the present invention.
Figure 2:
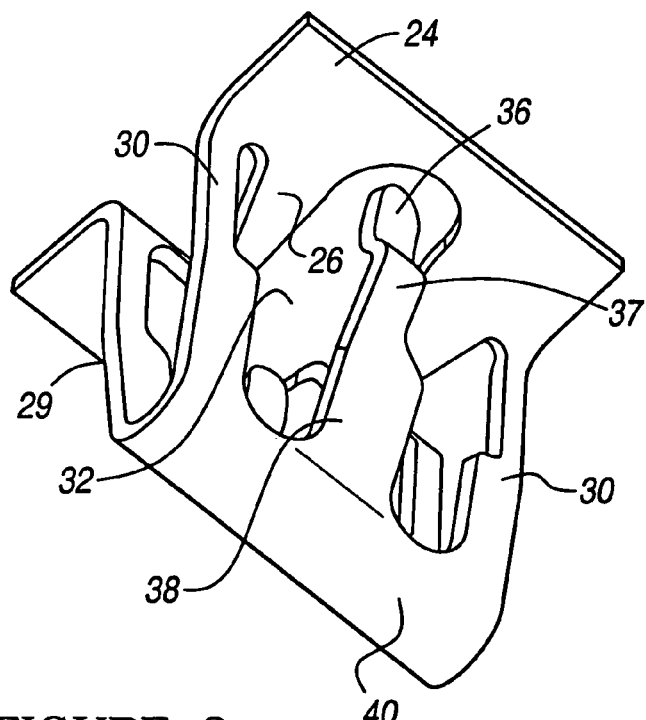
FIG. 2 is a lower perspective view of the fastener of FIG. 1.

Referring to FIGS. 1 through 8, a generally U-shaped fastener 20 in accordance with the present invention is disclosed. The generally U-shaped fastener 20 is defined by a body portion 22 and a pair of top flanges 24. Integral with the top flanges 24 are two pair of finger members 26 which are used to couple the generally U-shaped fastener 20 to a mounting flange (shown in FIG. 11). Additionally, the body portion 22 has a pair of abutting flanges 28 which generally lie outside side members 29 and 30 of the body portion 22. The side members, which are coupled by a bottom curved member 29 and 30, define a pair of apertures 32 and 33, which allow for the inward compression of the abutting flanges 28.

Generally, the abutting flanges 28 are defined by three portions. The first portion 36 is defined by an exterior concave engaging surface 50. The second portion 37, which acts as a transition to the third portion 38, is defined by a convex surface. The third portion 38 functions to couple the abutting flange 28 to the base portion 40 of the body 22 of the generally U-shaped fastener 20.

FIG. 3a depicts a side view of the generally U-shaped fastener 20 of the current invention. Shown is the relationship of the finger members 26 to the abutting flanges 28, which are formed within the aperture 32. As best seen in FIGS. 3b and 4, the tips 42 of the finger members 26 are angled to frictionally engage a flange member 54 of a trim component 60. FIG. 3b shows the relationship of the third portion 38 to the base member 40 of the body portion 22.

FIG. 4 is a side view of the U-shaped fastener 20 and shows the relationship of the abutting flanges 28 to the body portion 22. As can be seen, the top flanges 24 defines an upper keyhole slot 49 which allow the movement of the abutting flanges 28 when they are compressed. Further depicted is the angular relationship of the side members 29 and 30 of the body portion with respect to the base 40 and the top flanges 24. It must be noted that while the finger member 26 are shown, any suitable fastener is usable. This includes but is not limited to a hole, threaded hole, slots or flanges.

FIG. 5a depicts a top view of the generally U-shaped fastener 20. Defined by the side members 29 and 30 is a slot 48 which is used to engage the coupling flange 54 (see FIGS. 9 and 11) of a trim component 60. The exterior concave surface 50 of the abutting flanges 28 are used to engage sheet metal to hold the fastener in place. Also depicted is the interior surface 52 of the finger members 26, which engage the surfaces of the coupling flange 54.

FIG. 5b is a cross-section of the fastener as shown in FIG. 5a. Depicted is the relationship of the abutting flanges 28 with the base member 40. Further, the cross-section details the radius of the exterior concave surface 50. The radius of the concave surface 50 generally can be between 3.5 to 6.0 millimeters and preferably 4.75 millimeters. The center of curvature for the radius R is between 2 and 4 millimeters from the top of the fastener and preferably 2.3 millimeters. FIG. 5c best details the relationship of the finger members 26 to the top flanges 24 and the first and second flange members 43 and 44.

Figure 6:
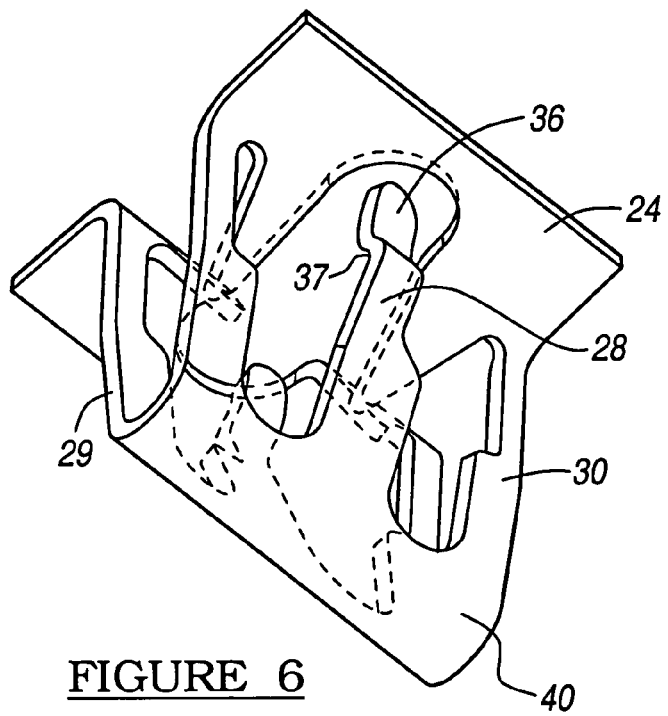
FIG. 6 is a lower perspective view of the fastener of FIG. 1.
Figure 7:
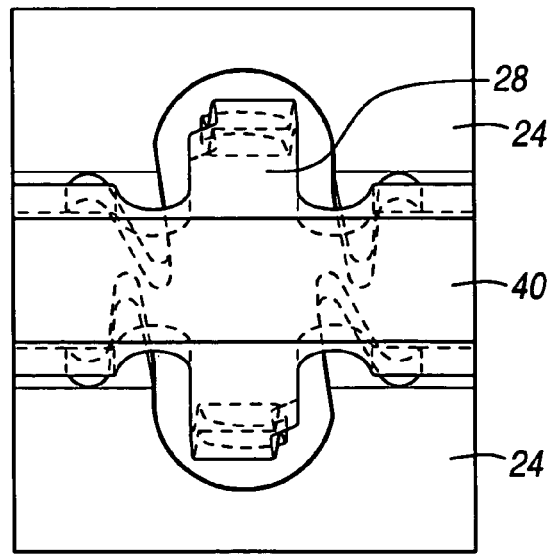
FIG. 7 is a bottom view of the fastener of FIG. 1.
Figure 8:
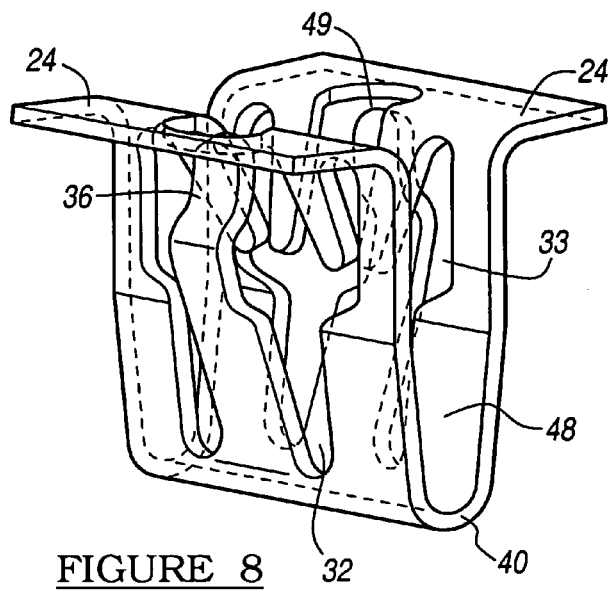
FIG. 8 is a perspective view of the fastener of FIG. 1.

FIGS. 6 through 8 are depictions of the U-shaped fastener 20 of the current invention with hidden components shown in phantom. Depicted is the relationship of the fastener components with various surfaces of the fastener.

Figure 9:
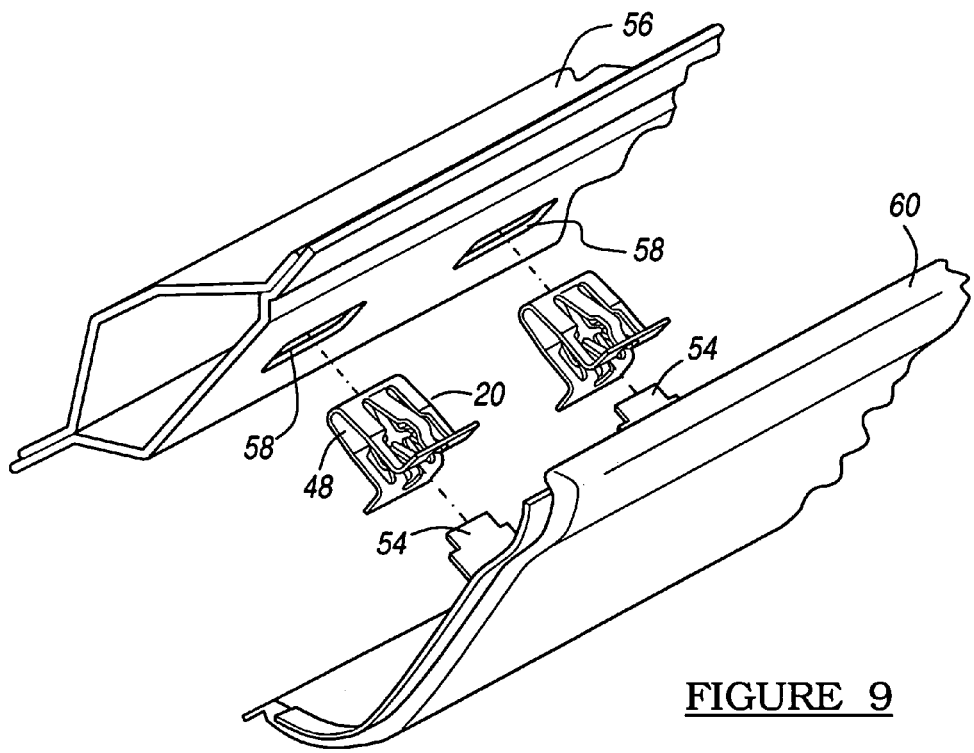
FIG. 9 is an exploded perspective view showing the fastener being used to mount an interior trim component.

FIG. 9 depicts the use of the U-shaped fastener 20 of the current invention. Shown is a sheet metal structure 56, which defines a pair of apertures 58. The apertures 58 are designed to accept the U-shaped fastener 20 to allow for the mating of a trim component 60 to the sheet metal 56. The trim component 60 has a pair of flanges 54, which are inserted, into the slot 48 of the U-shaped fastener 20.

Figure 10A:
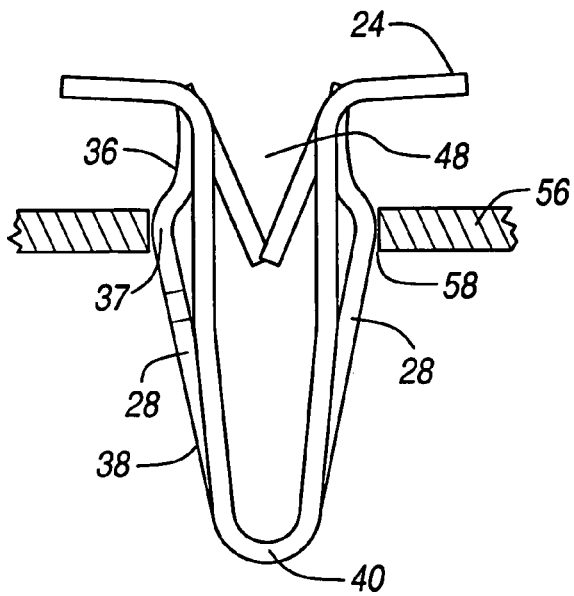
FIGS. 10a and 10b show the insertion of the fastener.
Figure 10B:
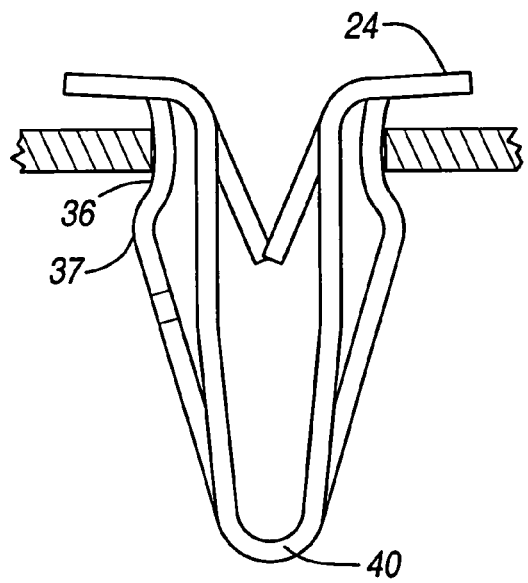

As best seen in FIG. 10, the U-shaped fastener 20 is inserted into the aperture 58 of the sheet metal structure 56. As the fastener 20 is depressed into the aperture 58, the abutting flanges 28 are compressed toward each other and the centerline of the U-shaped fastener 20. This compression of the abutting flanges 28 continues until the sheet metal 56 of the aperture 58 reaches the second portion 37 of the abutting flanges. At this point, a transition occurs and the sheet metal 56 is allowed to engage with the concave surface 50 of the first portion 36 of the abutting flanges 28.

Figure 11:
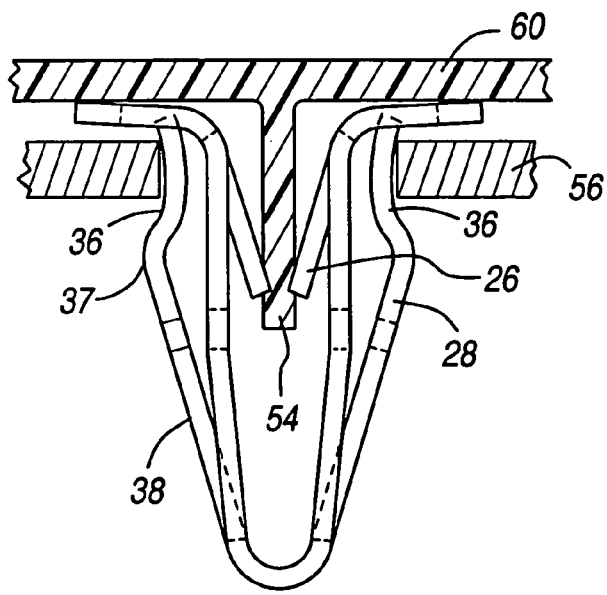
FIG. 11 is a cross-sectional view of the fastener of FIG. 10 with corresponding trim component
Figure 12:
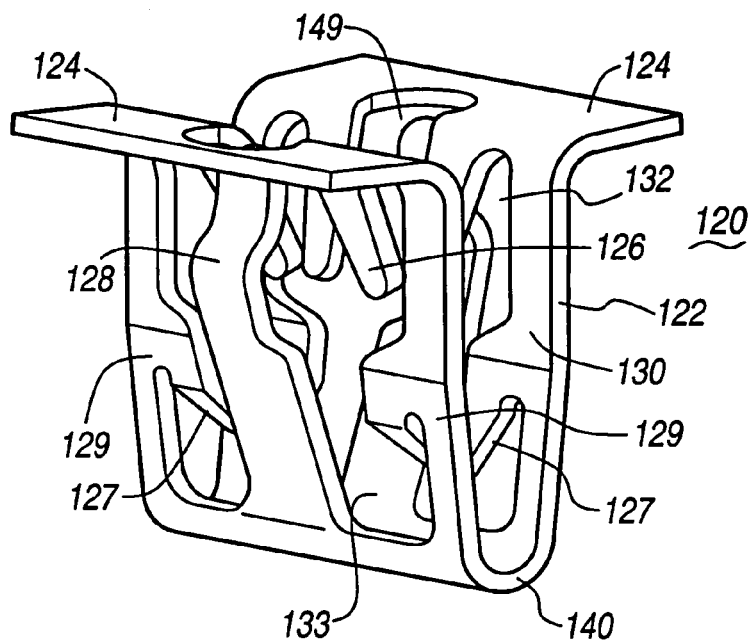
FIG. 12 is a perspective view of a fastener constructed in accordance with the teachings of a second embodiment of the present invention.
Figure 13:
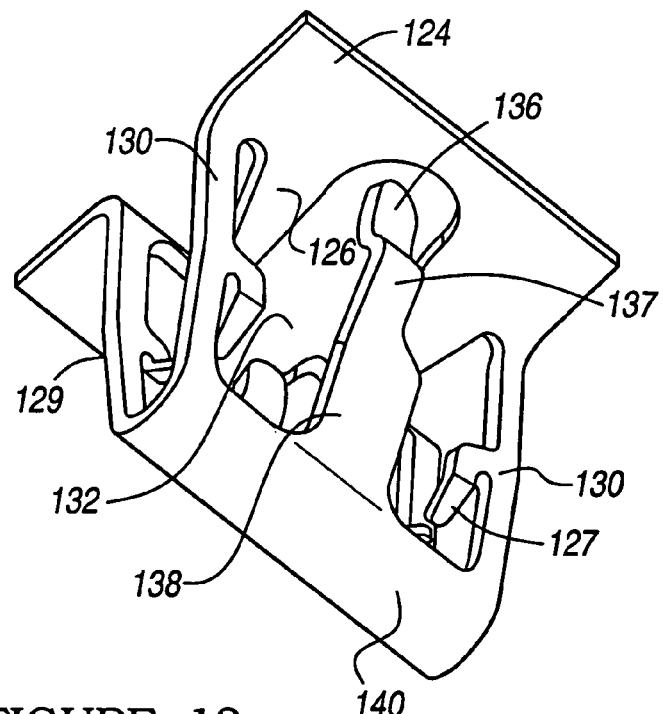
FIG. 13 is a lower perspective view of the fastener of FIG. 12.

FIG. 11 depicts the coupling of the trim component 60 to the U-shaped fastener 20. Shown is the coupling flange 54 inserted between the finger members 26 of the U-shaped fastener 20.

It has been shown that the current fastener 20 is significantly more easy to insert into a sheet metal structure 56 than it is to remove. For example, the fastener as depicted has a required insertion force of about 10 pounds and a removal force of greater than 20 pounds.

Referring to FIGS. 12 through 20, a generally U-shaped fastener 20 in accordance with a second embodiment of the present invention is disclosed. The generally U-shaped fastener 120 is defined by a body portion 122 and a pair of top flanges 124. Integral with the top flanges 124 are two pair of first finger member 126 and a pair of second finger member 127 which are used to couple the generally U-shaped fastener 120 to a mounting flange (shown in FIG. 20). Additionally, the body portion 122 has a pair of abutting flanges 128 which generally lie outside the side members 129 and 130 of the body portion 122. The side members 129 and 130 define a pair of apertures, 132 and 133, which allow for the inward compression of the abutting flanges 128.

Generally, the abutting flanges 128 are defined by three portions. The first portion 136 is defined by an exterior concave engaging surface 150. The second portion 137, which acts as a transition to the third portion 138, is defined by a convex surface. The third portion 138 functions to couple the abutting flange 128 to the base portion 140 of the body 122 of the generally U-shaped fastener 120.

Figure 14A:
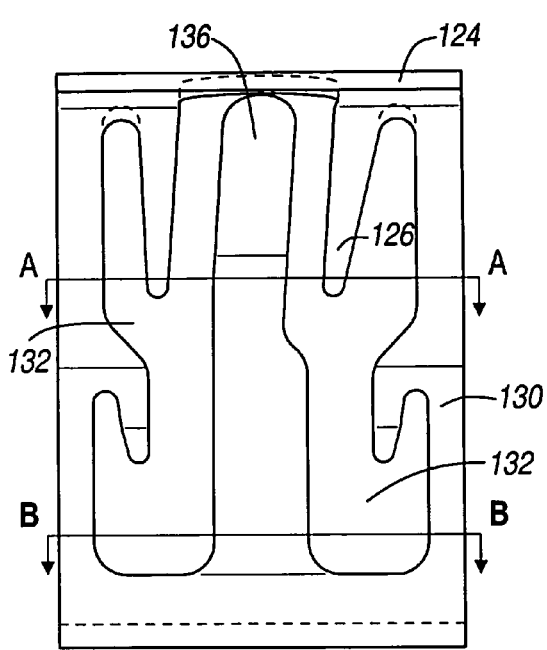
FIG. 14a is a side view of a portion of the fastener of FIG. 13 illustrating the spacing of the structures in greater detail.
Figure 15:
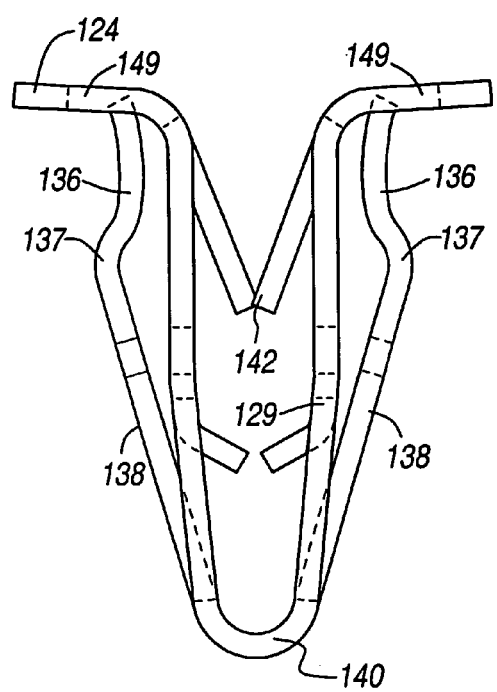
Figure 14B:
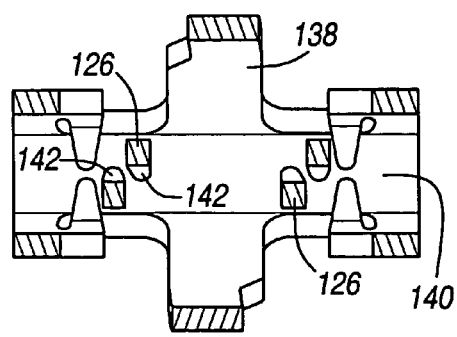
Figure 14C:
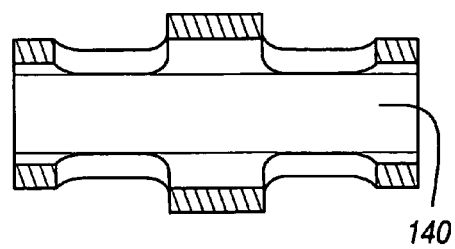

FIG. 14a depicts a side view of the generally U-shaped fastener 120 of the second embodiment of the current invention. Shown is the relationship of the first finger member 126 and second finger member 127 to the abutting flanges 128, which are formed within the aperture 132. As best seen in FIGS. 14b and 15, the tips 142 of the first finger member 126 and the tips 143 of the second finger member 127 are angled to frictionally engage a flange member 154 of a trim component 160. The angle of the first finger member 126 can be between about 15° to 25° and preferably about 20°, while the angle of the second finger member 127 can be between about 50° to 60° and preferably about 55°.

FIG. 14b shows the relationship of the third portion 138 to the base member 140 of the body portion 122.

FIG. 15 is a side view of the U-shaped fastener 120 and shows the relationship of the abutting flanges 128 to the body portion 122. As can be seen, the top flanges 124 defines an upper keyhole slot 149 which allow the movement of the abutting flanges 128 when they are compressed. Further depicted is the angular relationship of the side members 129 and 130 of the body portion with respect to the base 140 and the top flanges 124. It must be noted that while the finger members 126 and 127 are shown, any suitable fastener is usable. This includes but is not limited to a hole, threaded hole, slots or flanges.

FIG. 15a depicts a top view of the generally U-shaped fastener 120. Defined by the side members 129 and 130 is a slot 148 which is used to engage the coupling flange 154 (see FIGS. 19 and 21) of a trim component 160. The exterior concave surface 150 of the abutting flanges 128 are used to engage sheet metal to hold the fastener in place. Also depicted is the interior surface 152 of the first and second finger members 126 and 127, which engage the surfaces of the coupling flange 154.

FIG. 15b is a cross-section of the fastener as shown in FIG. 15a. Depicted is the relationship of the abutting flanges 128 with the base member 140. Further, the cross-section details the radius of the exterior concave surface 150. The radius of the concave surface 150 generally can be between 3.5 to 6.0 millimeters and preferably 4.75 millimeters. The center of curvature for the radius R is between 2 and 4 millimeters from the top of the fastener and preferably 2.3 millimeters. FIG. 15c best details the relationship of the first finger member 126 to the top flanges 124 and the first and second flange members 143 and 144.

Figure 16:
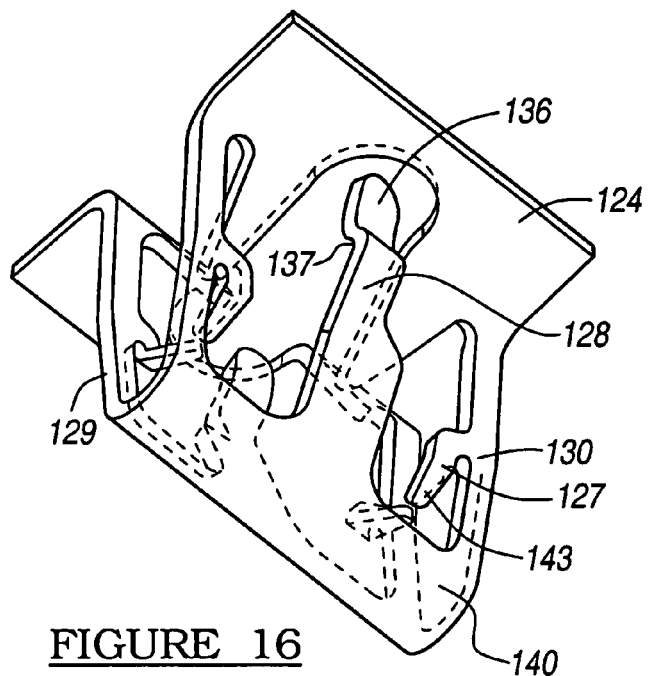
FIG. 16 is a side view of a fastener constructed in accordance with the teachings of the preferred embodiment of the present invention.
Figure 17:
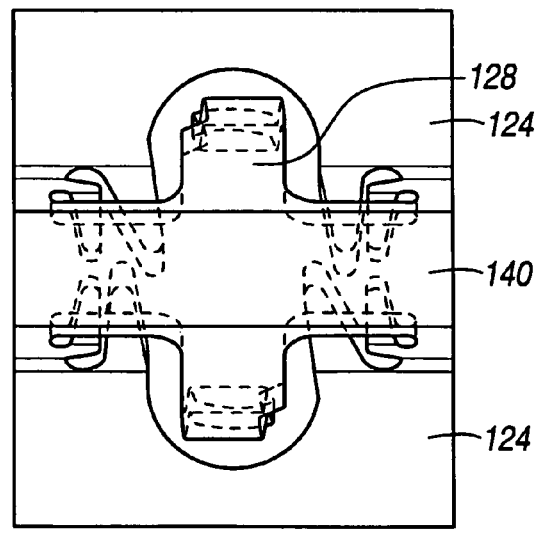
FIG. 17 is a bottom view of the fastener of FIG. 12.
Figure 18:
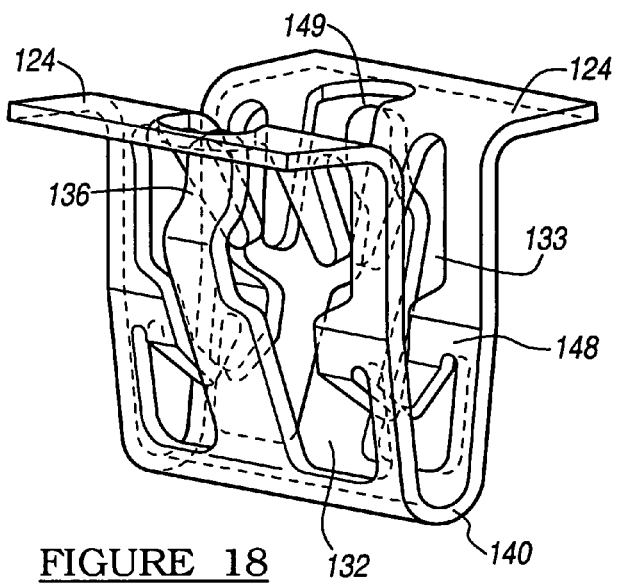
FIG. 18 is a perspective view of the fastener of FIG. 12.

FIGS. 16 through 18 are depictions of the U-shaped fastener 120 of the current invention with hidden components shown in phantom. Depicted is the relationship of the fastener components with various surfaces of the fastener.

Figure 19:
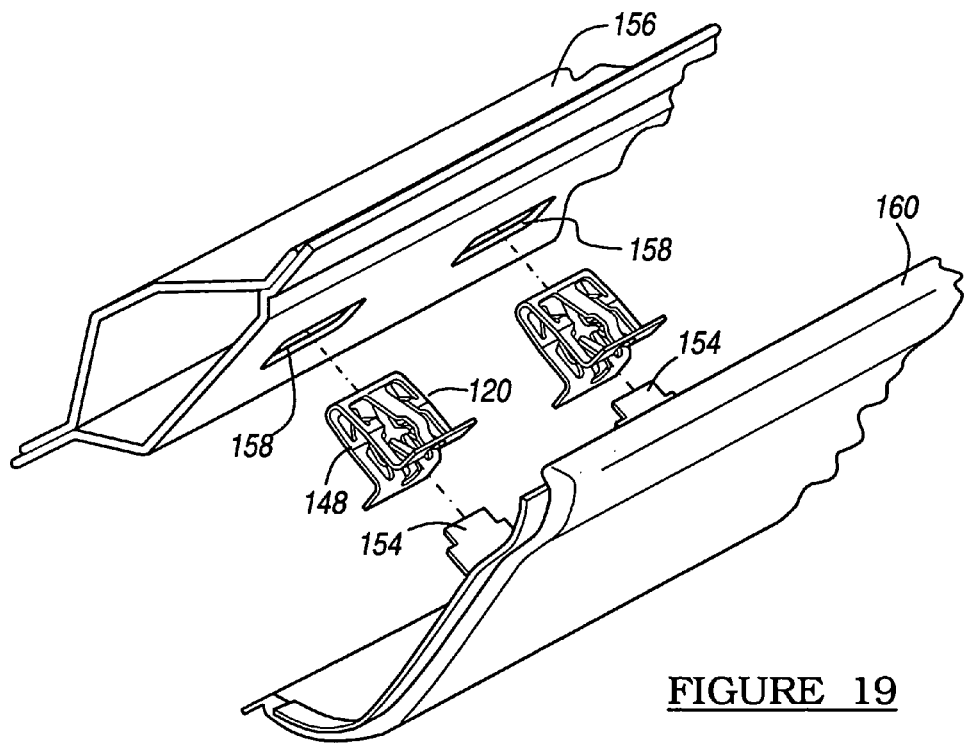
FIG. 19 is an exploded perspective view showing the fastener being used to mount an interior trim component.

FIG. 19 depicts the use of the U-shaped fastener 120 of the current invention. Shown is a sheet metal structure 156, which defines a pair of apertures 158. The apertures 158 are designed to accept the U-shaped fastener 120 to allow for the mating of a trim component 160 to the sheet metal 156. The trim component 160 has a pair of flanges 154, which are inserted, into the slot 148 of the U-shaped fastener 120.

Figure 20A:
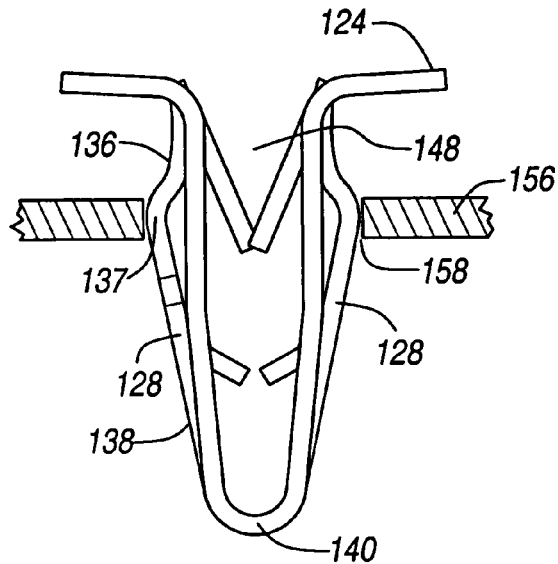
FIGS. 20a and 20b show the insertion of the fastener.
Figure 20B:
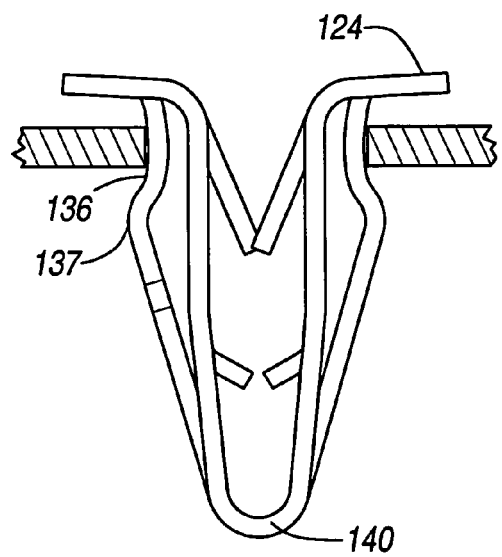

As best seen in FIG. 20, the U-shaped fastener 120 is inserted into the aperture 158 of the sheet metal structure 156. As the fastener 120 is depressed into the aperture 158, the abutting flanges 128 are compressed toward each other and the centerline of the U-shaped fastener 120. This compression of the abutting flanges 128 continues until the sheet metal 156 of the aperture 158 reaches the second portion 137 of the abutting flanges. At this point, a transition occurs and the sheet metal 156 is allowed to engage with the concave surface 156 of the first portion 136 of the abutting flanges 128.

Figure 21:
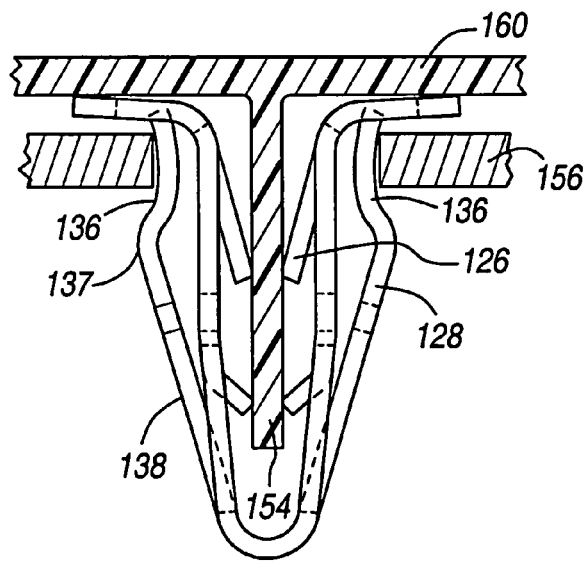
FIG. 21 is a cross-sectional view of the fastener of FIG. 20 with corresponding trim component

FIG. 21 depicts the coupling of the trim component 160 to the U-shaped fastener 120. Shown is the coupling flange 154 inserted between the first and second finger members 126 and 127 of the U-shaped fastener 120.

It has been shown that the current fastener 120 is significantly more easy to insert into a sheet metal structure 156 than it is to remove. For example, the fastener as depicted has a required insertion force of about 10 pounds and a removal force of greater than 20 pounds.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastener adapted to removably mount an object in a mounting aperture of a panel, comprising:
   a fastener body having two opposing top flanges and two opposing side members and defining a first aperture configured to accept at least a portion of the object;
   at least one elastic abutting flange defining an exterior concave portion and a convex portion immediately adjacent the concave portion extending a width of said elastic abutting flange and configured to engage an inner surface of the mounting aperture when the fastener is inserted into the mounting aperture, said elastic abutting flange being disposed between said fastener body and said mounting aperture, said convex portion extending into an opening in at least one of said two opposing top flanges; and
   a first pair of finger members disposed along each of said side members and configured to slidably accept a portion of the object.

2. The fastener according to claim 1 wherein each outside edge of said two opposing side members are generally parallel.

3. The fastener according to claim 2 wherein at least one of said two opposing side members defines a second aperture configured to allow inward compression of said elastic abutting flange.

4. A fastener according to claim 3 further comprising a pair of elastic abutting flanges.

5. The fastener according to claim 1 comprising a first pair of finger members disposed along each said side member and configured to slidably accept a portion of the object.

6. The fastener according to claim 1 further comprising a second pair of finger members disposed along each said side member and configured to slidably accept a portion of the object.

7. The fastener according to claim 6 wherein said fastener body defines a centerline and said second pair of finger members engage said centerline at an angle between about 50° and about 60°.

8. The fastener according to claim 6 wherein said second pair of finger members disposed along each said side member further comprising finger members that are offset from each other.

9. The fastener according to claim 1 wherein said fastener body defines a centerline and said first pair of finger members engage said centerline at an angle between 15° and about 20°.

10. The fastener according to claim 9 wherein said concave portion extending into an opening of at least one of said two opposing top flanges allows the fastener to be removable from the mounting aperture of a panel.

11. A U-shaped fastener adapted to be removably mounted within a mounting aperture of a panel comprising:
    a body defining a pair of side members coupled by a curved end member, at least one of said pair of side members comprising a first and second pair of finger members configured to slidably accept a coupling flange; and
    a pair of abutting flanges defining an exterior concave surface and an exterior convex surface adjacent the concave surface, the concave and convex surfaces extending a width of each said abutting flange and configured to engage an inner surface of the mounting aperture when the fastener is inserted into the mounting aperture, said convex portion extending into an opening in at least one said two opposing top flanges;

wherein said body defines a centerline and said first pairs of finger members cross the centerline and define a surface oriented at an angle between about 15° and 25° of said centerline.

12. The fastener according to claim 11 wherein said abutting flanges are coupled to said curved end member.

13. The fastener according to claim 11 wherein said pair of side members define a first aperture configured to allow inward compression of said abutting flanges.

14. The fastener according to claim 11 wherein said second pairs of finger members define a surface oriented at an angle between about 50° and 60°.

15. The fastener according to claim 11 wherein said fingers comprise a tip portion capable of coupling said fingers to said coupling flange.

16. The fastener according to claim 11 wherein said abutting flanges are disposed between said body and the mounting aperture.

17. The fastener according to claim 11 wherein said abutting flanges further comprise an exterior convex surface.

18. The fastener according to claim 11 wherein said fingers are deformable toward said body.

19. The fastener according to claim 11 wherein said convex portion extending into an opening of at least one of said two opposing top flanges allows the fasteners to be removable from the mounting aperture of a panel.

20. A fastener for removably mounting a coupling flange in a panel aperture, the fastener comprising:

a base portion;

two opposing side walls integrally connected to said base portion and forming a substantially U-shaped body, each said side wall having an outwardly extending top flange member;

a pair of elastic abutting flanges integrally formed with and outwardly extending from said base portion and into an aperture in each said top flange member;

a first pair of spaced apart finger members integrally formed with each said top flange member; and a second pair of spaced apart finger members integrally formed with each said side wall, and wherein the base portion and opposed sidewalls define a centerline and wherein said finger members cross said centerline, and wherein said pairs of finger members inwardly extend into said body of the fastener and are configured to grippingly engage the coupling flange.

21. A fastener according to claim 20 wherein each said abutting flange defines a concave exterior bend surface extending a width of said abutting flange, wherein said bend surface is configured to engage an inner surface of the panel aperture.

22. A fastener according to claim 21 wherein said concave exterior bend surface has a radius of curvature from about 3.5 to about 6 mm.

23. The fastener according to claim 21 wherein said convex portion extending into an opening of at least one of said two opposing top flanges allows the fasteners to be removable from the panel aperture.

24. A fastener according to claim 20 wherein said first pair of finger members inwardly extend at an angle from about 15 to about 25 degrees with respect to said side walls.

25. A fastener according to claim 20 wherein said second pair of finger members inwardly extend at an angle from about 50 to about 60 degrees with respect to said side walls.

* * * * *